United States Patent
Serenyi (10) Patent No.: US 8,391,494 B1
(45) Date of Patent: Mar. 5, 2013

(54) SYSTEMS AND METHODS FOR PROTECTING ENTERPRISE RIGHTS MANAGEMENT KEYS

(75) Inventor: Denis Serenyi, Arlington, VA (US)

(73) Assignee: Symantec Corporation, Mountain View, CA (US)

( * ) Notice: Subject to any disclaimer, the term of this patent is extended or adjusted under 35 U.S.C. 154(b) by 1044 days.

(21) Appl. No.: 12/393,344

(22) Filed: Feb. 26, 2009

(51) Int. Cl.
  *H04L 29/06* (2006.01)
(52) U.S. Cl. ............... 380/278; 713/171; 705/21
(58) Field of Classification Search ............ 380/278; 705/21
  See application file for complete search history.

(56) References Cited

U.S. PATENT DOCUMENTS

| | | | |
|---|---|---|---|
| 2007/0100701 A1* | 5/2007 | Boccon-Gibod et al. | 705/21 |
| 2010/0042988 A1* | 2/2010 | Lundin et al. | 717/176 |

OTHER PUBLICATIONS

McCune, Jonathan M.; Flicker: An Execution Infrastructure for TCB Minimization; ACM European Conference on Computer Systems (EuroSys), Glasgow, Scotland, Mar. 31, 2008.*

\* cited by examiner

*Primary Examiner* — Jeffrey Pwu
*Assistant Examiner* — Thong Truong
(74) *Attorney, Agent, or Firm* — Advantedge Law Group (57) ABSTRACT

A computer-implemented client-side method for protecting enterprise rights management keys from being compromised by untrusted client devices may comprise: 1) detecting a request on a client device to access protected data, 2) dynamically instantiating a processor-based secure virtual machine on the client device, 3) establishing a secure communication channel between the secure virtual machine and a policy server, 4) receiving, via the secure communication channel, a content key from the policy server, and then 5) decrypting, using the content key, the protected data using the secure virtual machine. Server-side methods, along with corresponding systems and computer-readable media, are also disclosed.

14 Claims, 9 Drawing Sheets

FIG. 9

SYSTEMS AND METHODS FOR PROTECTING ENTERPRISE RIGHTS MANAGEMENT KEYS

BACKGROUND

Enterprise rights management (ERM) systems are typically used to ensure that information within an enterprise complies with high-level corporate policies. In many conventional enterprise rights management systems, protected content is encrypted with keys that are stored on policy servers that ensure that requests to access protected data comply with an enterprise's data-access policies before releasing keys to requesting clients.

Many client devices within ERM systems run on commodity operating systems that are vulnerable to attack. Unfortunately, a compromised client device may result in the leak or theft of both protected content and content keys. While the loss of protected content may be damaging, the loss or theft of a content key may result in devastating losses since a single key may be used to encrypt a considerable amount of content. As such, the instant disclosure identifies needs for systems and methods for protecting enterprise rights management keys from being compromised by vulnerable client devices.

SUMMARY

As will be described in greater detail below, the instant disclosure generally relates to systems and methods for protecting enterprise rights management keys from being compromised by vulnerable client devices. In one example, a method for performing such a task may comprise: 1) detecting a request on a client device to access protected data, 2) leveraging hardware-based security extensions (e.g., CPU-based security extensions, such as INTEL's TRUSTED EXECUTION TECHNOLOGY, and security coprocessors, such as a trusted platform module) to dynamically instantiate a processor-based secure virtual machine on the client device, and then 3) establishing a secure communication channel between the secure virtual machine and a policy server.

In some examples, the secure communication channel may be established by: 1) generating a private channel key and a public channel key using the secure virtual machine, 2) sealing the private channel key using a security coprocessor (such as a trusted platform module) on the client device so that only the secure virtual machine may unseal the private channel key, and then 3) transmitting the public channel key (which may be digitally signed by the security coprocessor) to the policy server.

In one example, the system may seal the private channel key by: 1) leveraging the hardware-based security extensions on the client device to dynamically instantiate the secure virtual machine, which in turn a) resets platform configuration registers (PCRs) on the security coprocessor and b) places a hash of the secure virtual machine into the PCRs, and then 2) encrypting, using the security coprocessor, the private channel key based at least in part on the hash of the secure virtual machine that is stored in the PCRs. In some examples, the client device may also transmit information (such as a nonce and the values stored in the security coprocessor's PCRs, each of which may be digitally signed by the security coprocessor) that may be used by the policy server to verify that the public channel key was generated by the secure virtual machine on the client device.

Upon transmitting the public channel key to the policy server, the client device may receive an encrypted version of a content key from the policy server that has been encrypted by the policy server using the public channel key. The system may then unseal the private channel key for use by the secure virtual machine on the client device by: 1) dynamically instantiating the secure virtual machine on the client device, 2) determining that values stored in PCRs on the security coprocessor verify that the secure virtual machine has been instantiated and then 3) decrypting, using the security coprocessor, the private channel key. The secure virtual machine may then decrypt the encrypted version of the content key using the unsealed private channel key.

By proceeding in this manner, the exemplary systems and methods described herein may encapsulate all encryption, decryption, and key management operations within a secure execution environment created by the dynamically instantiated secure virtual machine, thus preventing all other software and hardware on the client device from accessing either the decrypted content key or the unsealed private key.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for protecting enterprise rights management keys from being compromised by untrusted client devices. As used herein, the term "untrusted" may refer to devices, such as client devices running commodity operating systems, that are vulnerable to attack. In addition, the phrase "enterprise rights management keys" may refer to cryptographic keys that may be used to encrypt and decrypt protected data within an enterprise to ensure that access to this protected data complies with data-access policies within the enterprise.

Figure 1:
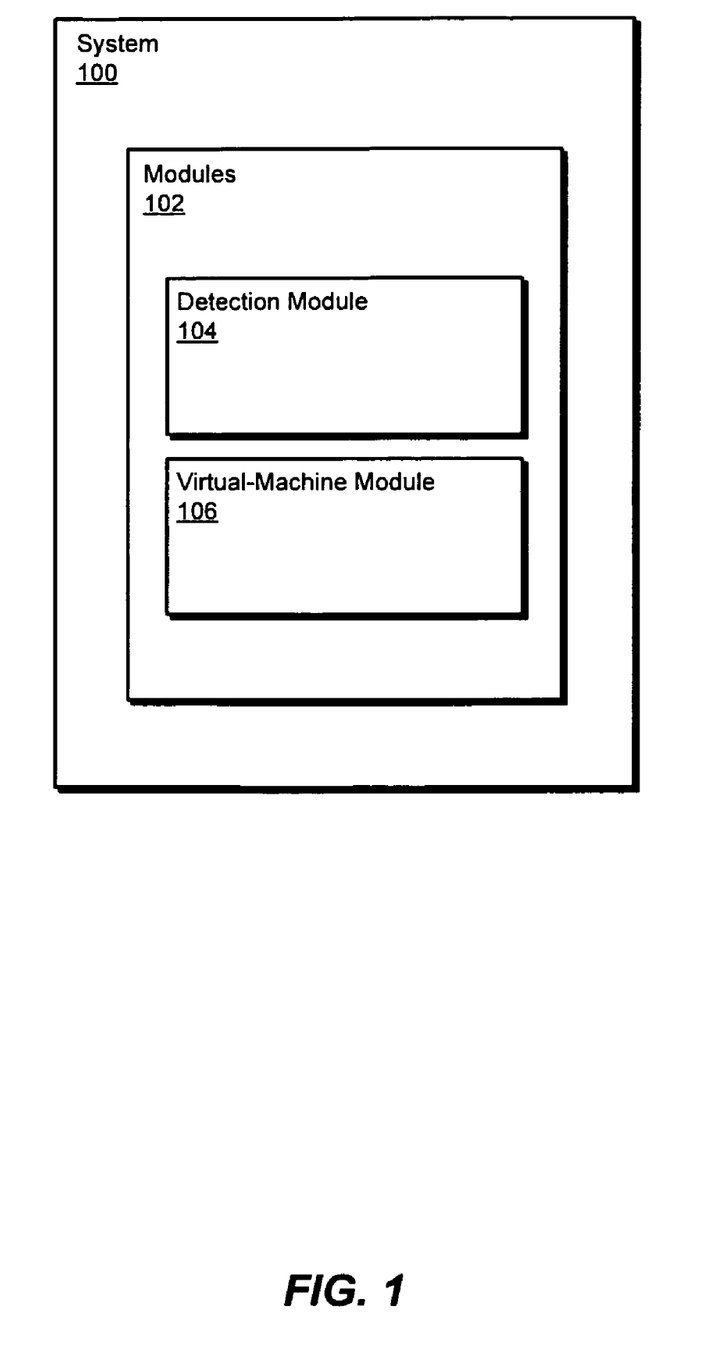
FIG. 1 is a block diagram of an exemplary system for protecting enterprise rights management keys from being compromised by untrusted client devices according to at least one embodiment.
Figure 2:
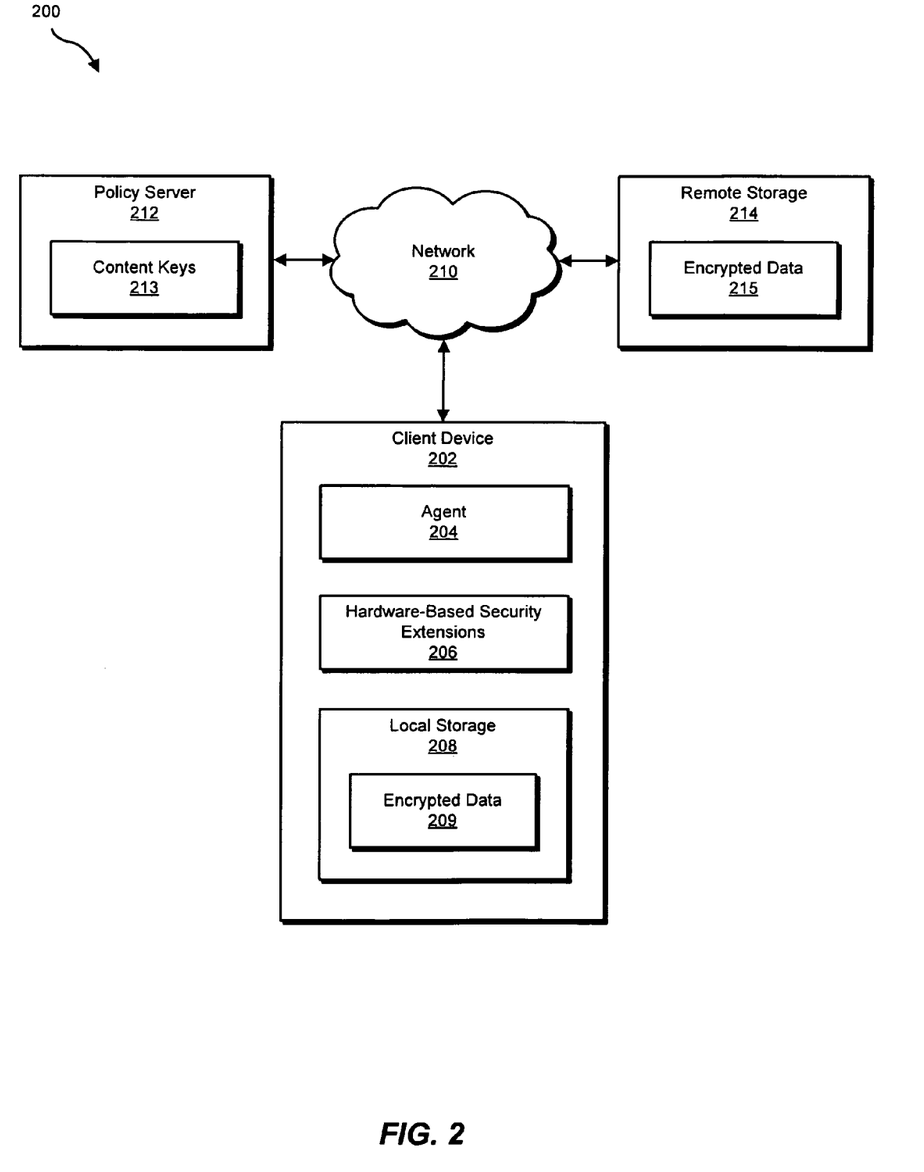
FIG. 2 is a block diagram of an exemplary system for protecting enterprise rights management keys from being compromised by untrusted client devices according to an additional embodiment.

The following will provide, with reference to FIGS. 1-2, detailed descriptions of exemplary systems for protecting enterprise rights management keys. Detailed descriptions of corresponding computer-implemented methods will be provided in connection with FIGS. 3-7. In addition, detailed descriptions of an exemplary computing system and network architecture capable of implementing one or more of the embodiments described herein will be provided in connection with FIGS. 8-9, respectively.

FIG. 1 is a block diagram of an exemplary system 100 for protecting enterprise rights management keys. As illustrated in this figure, exemplary system 100 may comprise one or more modules for performing one or more tasks. For example, and as will be explained in greater detail below, exemplary system 100 may comprise a detection module 104 programmed to detect a request on a client device (originating, for example, from an application on the client device) to access or encrypt protected data stored on a local or remote storage device. Exemplary system 100 may also comprise a virtual-machine module 106 programmed to dynamically instantiate, by leveraging various hardware-based security extensions on the client device, a processor-based secure virtual machine on the client device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., agent 204 on client device 202), computing system 810 in FIG. 8, and/or portions of exemplary network architecture 900 in FIG. 9. One or more of modules 102 in FIG. 1 may also represent all or portions of one or more special-purpose computers configured to perform one or more tasks.

FIG. 2 is a block diagram of an exemplary system 200 for protecting enterprise rights management keys. As illustrated in this figure, exemplary system 200 may comprise a client device 202 in communication with a policy server 212 and remote storage 214 via a network 210. In one embodiment, and as will be described in greater detail below, an agent 204 (comprising, for example, one or more of modules 102 in FIG. 1) stored on computing device 202 may detect requests to access or encrypt protected data (stored, for example, as encrypted data 209 and/or encrypted data 215 on local storage 208 and/or remote storage 214). As will be explained below, agent 204 may also leverage various hardware-based security extensions 206 on client device 202 to dynamically instantiate a secure virtual machine to securely protect access this protected data.

Client device 202 generally represents any type or form of computing device capable of reading computer-executable instructions. Examples of client device 202 include, without limitation, laptops, desktops, servers, cellular phones, personal digital assistants (PDAs), multimedia players, embedded systems, combinations of one or more of the same, exemplary computing system 810 in FIG. 8, or any other suitable computing device.

Policy server 212 generally represents any type or form of computing device that is capable of administering data-access policies in an enterprise. Local storage 208 and remote storage 214 generally represents any type or form of remote storage device, such as the storage devices illustrated and described in connection with FIGS. 8 and 9.

Network 210 generally represents any medium or architecture capable of facilitating communication or data transfer. Examples of network 210 include, without limitation, an intranet, a wide area network (WAN), a local area network (LAN), a personal area network (PAN), the Internet, power line communications (PLC), a cellular network (e.g., GSN Network), exemplary network architecture 900 in FIG. 9, or the like. Network 210 may facilitate communication or data transfer using wireless or wired connections. In one embodiment, network 210 may facilitate communication between client device 202, policy server 212, and remote storage 214.

Figure 3:
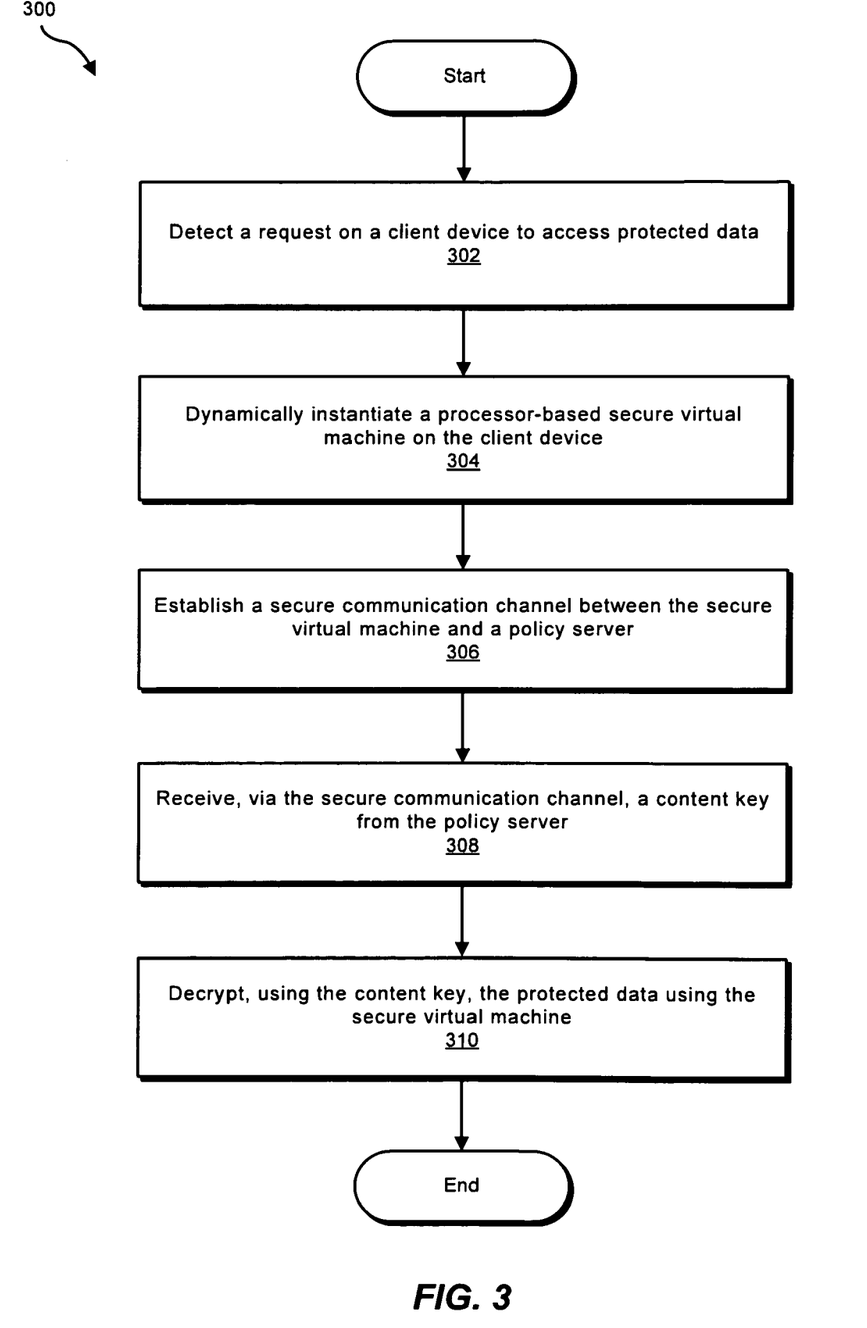
FIG. 3 is a flow diagram of an exemplary client-side method for protecting enterprise rights management keys from being compromised by untrusted client devices.

FIG. 3 is a flow diagram of an exemplary client-side method 300 for protecting enterprise rights management keys from being compromised by untrusted client devices. As illustrated in this figure, at step 302 the system may detect a request on a client device to access protected data. For example, agent 204 in FIG. 2 (which may, as detailed above, comprise detection module 104 in FIG. 1) may detect a request by a user of client device 202 to access encrypted data 209 and/or encrypted data 215. As illustrated in this figure, protected data may be stored on local storage devices (e.g., local storage 208) and/or remote storage devices (e.g., remote storage 215).

At step 304, the system may dynamically instantiate a processor-based secure virtual machine on the client device. For example, agent 204 in FIG. 2 (which may, as detailed above, comprise virtual-machine module 106 in FIG. 1) may, by leveraging hardware-based security extensions 206 on client device 202, dynamically instantiate a processor-based secure virtual machine on client device 202.

The phrase "secure virtual machine," as used herein, may refer to a code module that utilizes hardware-based security extensions on a client device to create an execution environment on the client device that is completely insulated from all other software on the client device. In some examples, a secure virtual machine may prevent direct memory access to its execution environment, disable interrupts, and otherwise insulate its execution environment from external access. Examples of hardware-based security extensions that may be leveraged when dynamically instantiating secure virtual machines include, without limitation, processor-based and security-coprocessor-based security extensions (such as INTEL's TRUSTED EXECUTION TECHNOLOGY, trusted platform modules or other security coprocessors that conform to standards promulgated by the TRUSTED COMPUTING GROUP, and the like), chipset-based security extensions, user-input-based security extensions, display-interface-based security extensions, or the like.

As used herein, the phrase "dynamically instantiate" may refer to a process that invokes or instantiates a secure virtual machine without requiring or initiating a trusted boot process. For example, agent 204 in FIG. 2 (which may, as detailed above, comprise virtual-machine module 106 in FIG. 1) may, by leveraging hardware-based security extensions 206 on client device 202, dynamically instantiate a secure virtual machine on client device 202 without having to reboot into a hypervisor via a trusted boot process that leverages hardware-based security extensions 206 on client device 202. In this example, the dynamic secure virtual machine may be instantiated without modifying the standard boot process of client device 202, which may in turn allow the secure virtual machine to execute at any time from within an insecure, untrusted operating system on client device 202.

Figure 4:
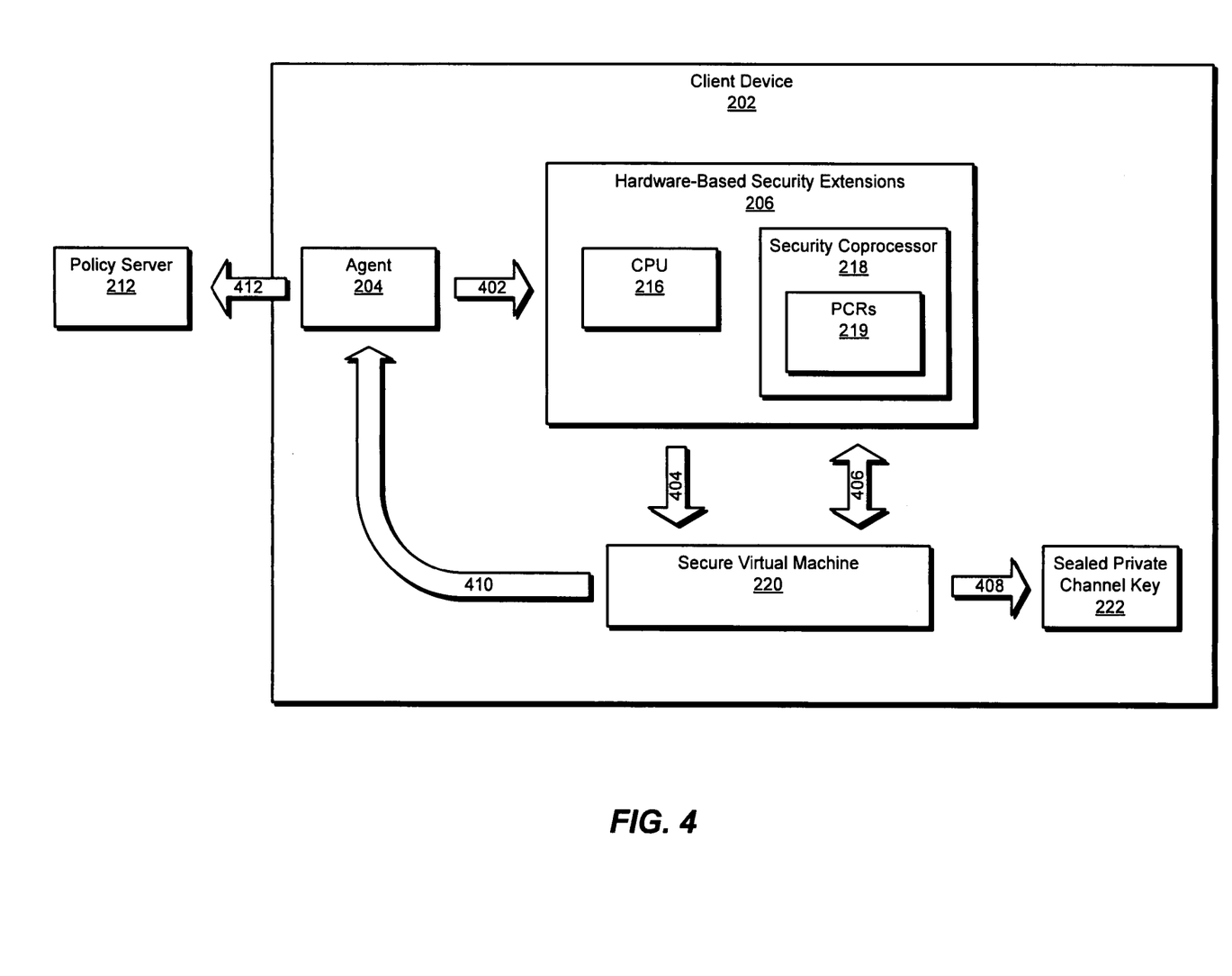
FIG. 4 is an illustration of data flow that occurs when protecting enterprise rights management keys according to one embodiment.

The system may perform step 304 in FIG. 3 in a variety of ways. For example, as illustrated in FIG. 4, agent 204 may instruct hardware-based security extensions 206 (which may, as illustrated in this figure, comprise CPU 216 and security coprocessor 218) on client device 202 to dynamically instantiate a secure virtual machine (act 402 in FIG. 4). In response, hardware-based security extensions 206 may dynamically instantiate a secure virtual machine 220 by creating an execution environment on client device 202 that is securely and completely insulated from all other software on client device 202 (act 404).

Returning to FIG. 3, at step 306 the system may establish a secure communication channel between a policy server and the secure virtual machine instantiated in step 304. For example, secure virtual machine 220 on client device 202 in FIG. 4 may establish a secure communication channel between itself and policy server 212.

The system may perform step 306 in a variety of ways. In one example, the system may establish a secure communication channel by: 1) generating, using the secure virtual machine, a private channel key and a public channel key, 2) sealing, using a security coprocessor on the client device, the private channel key so that only the secure virtual machine may unseal the private channel key, and then 3) transmitting the public channel key to the policy server.

For example, as illustrated in FIG. 4, secure virtual machine 220 may, by leveraging hardware-based security extensions 206, generate a channel key pair that comprises a private channel key and a public channel key (act 406). Secure virtual machine 220 may then, by leveraging hardware-based security extensions 206, seal private channel key 222 (act 408).

The system may seal the private channel key in a variety of ways. In one example, the system may seal the private channel key by: 1) leveraging hardware-based security extensions on the client device to dynamically instantiate the secure virtual machine, which in turn may a) reset PCRs on the security coprocessor and b) place a hash of the secure virtual machine into the PCRs, and then 2) encrypting, using the security coprocessor, the private channel key based at least in part on the PCR values (which, as detailed above, will contain the hash of the secure virtual machine).

For example, upon receiving an instruction to dynamically instantiate a secure virtual machine (act 402), CPU 216 may execute a special processor instruction (based on, for example, INTEL's TRUSTED EXECUTION TECHNOLOGY or some other hardware-based security extension) that dynamically instantiates secure virtual machine 220 (act 404), which in turn may zero out PCRs 219 of security coprocessor 218 and place a hash of secure virtual machine 220 into PCRs 219.

The term "PCR," as used herein, generally refers to the registers of a security coprocessor, such as a security coprocessor that adheres to standards promulgated by the TRUSTED COMPUTING GROUP. While PCRs may not be directly set by software, software may request that a security coprocessor place or "extend" new values into the PCRs of a security coprocessor, where an extend operation may be defined as:

$$\text{New PCR Value} = \text{Hash}(\text{Old PCR Value}, \text{User Data}) \quad 1.1$$

where Hash may refer to any one-way hash algorithm, such as SHA-1, and User Data may refer to data that is provided by software using the security coprocessor.

Returning to FIG. 4, security coprocessor 218 may then seal a private channel key generated by secure virtual machine 220 by encrypting the private channel key using an encryption algorithm whose input is based at least in part on the current values of PCRs 219 (which, in this case, are set to a hash of secure virtual machine 220). By sealing the private channel key in this manner, the system may bind the private channel key to a specific software state on client device 202 (i.e., instantiation of secure virtual machine 220). In other words, secure virtual machine 220 must be instantiated (thereby placing a hash of secure virtual machine 220 into PCRs 219 of security coprocessor 218) in order to unseal (i.e., decrypt and access) the private channel key.

Upon sealing the private channel key, secure virtual machine 228 in FIG. 4 may pass the public channel key that corresponds to the sealed private channel key 222 to agent 204 (act 410). In some examples, secure virtual machine 220 may also pass both a nonce (i.e., a "number used once," such as a random or pseudo-random number) and the values stored in PCRs 219 to agent 204. In some examples, security coprocessor 218 may also digitally sign the public channel key, the values stored in PCR 219, and the nonce. As will be described in greater detail below, this digitally signed information may be used by policy server 212 to verify that the public channel key was generated by secure virtual machine 220.

Agent 204 in FIG. 4 may then transmit this information (i.e., the digitally signed public channel key, nonce, and PCR values) to policy server 212 (act 412). In some examples, agent 204 may also transmit information that may be used by policy server 212 to verify that the request to access the protected data detected in step 302 complies with a data-access policy associated with the protected data. For example, agent 204 may transmit authentication and authorization information to policy server 212 that identifies and/or authenticates the originator (e.g., a user of, or an application on, client device 202) of the request detected in step 302.

Returning to FIG. 3, at step 308 the system may receive, via the secure communication channel established in step 306, a content key from the policy server. At step 310, the system may then decrypt, using the content key, the protected data using the secure virtual machine. Upon completion of step 310, exemplary method 300 in FIG. 3 may terminate.

The system may perform steps 308 and 310 in a variety of ways. In the example illustrated in FIG. 5, agent 204 may receive an encrypted version of the content key from policy server 212 that has been encrypted by policy server 212 using a public channel key generated by secure virtual machine 220 (act 502). Upon receiving the encrypted content key, agent 204 may instruct hardware-based security extensions 206 on client device 202 to dynamically instantiate a secure virtual machine (act 504). In response, hardware-based security extensions 206 may dynamically instantiate secure virtual machine 220 (act 506).

Figure 5:
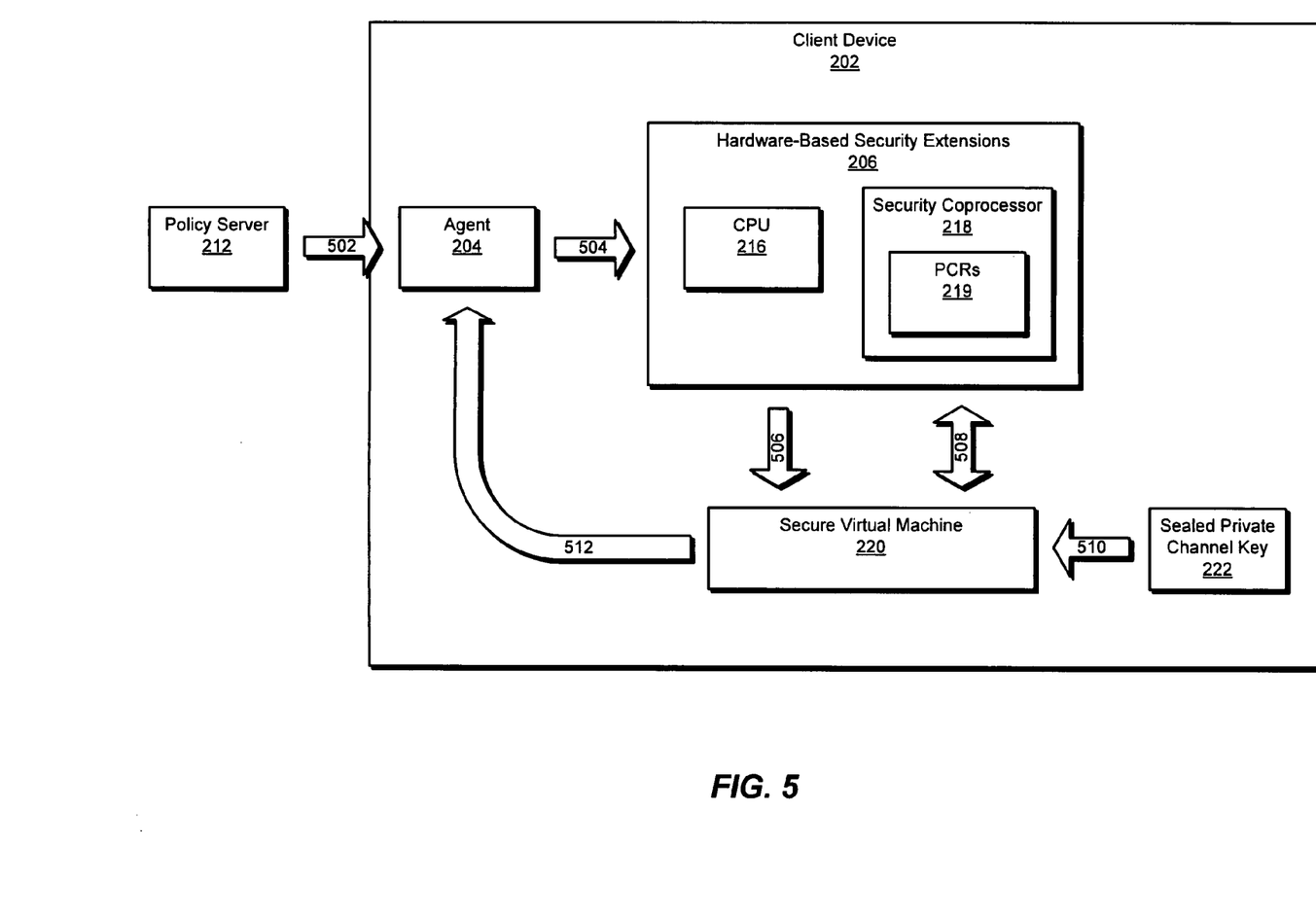
FIG. 5 is an illustration of data flow that occurs when protecting enterprise rights management keys according to one embodiment.

Secure virtual machine 220 may then instruct security coprocessor 218 to unseal the private channel key (act 508). If the PCRs 219 of security coprocessor 218 are set to a hash of secure virtual machine 220 (which, as detailed above, occurs when secure virtual machine 220 is instantiated), then security coprocessor 218 may unseal (i.e., decrypt) sealed private channel key 222 (act 510). Secure virtual machine 220 may then use the unsealed private channel key to decrypt the encrypted version of the content key received from policy server 212. Secure virtual machine may then use the decrypted content key to decrypt the protected data identified in step 302 (e.g., encrypted data 209 and/or encrypted data 215).

Upon decrypting the protected data, secure virtual machine 220 may then pass the decrypted data to agent 204 (act 512 in FIG. 5). However, to ensure the integrity of the system, secure virtual machine 220 may refrain from exposing the private channel key or decrypted content key to any other hardware or software on client device 202 (including agent 204). The decrypted data may then be used in accordance with the access request detected in step 302.

As detailed above, the sealed private channel key may only be unsealed by the secure virtual machine, thereby preventing all other software and hardware on the client device from accessing the content key that has been encrypted using this private channel key. By proceeding in this manner, the exemplary systems and methods described herein may encapsulate all encryption, decryption, and key management operations within a secure execution environment created by the dynamically instantiated secure virtual machine. Because these systems and methods prevent all other software and hardware on a client device from accessing content within the secure virtual machine, the systems and methods described herein may allow untrusted client devices to access protected data without compromising enterprise rights management keys.

Figure 6:
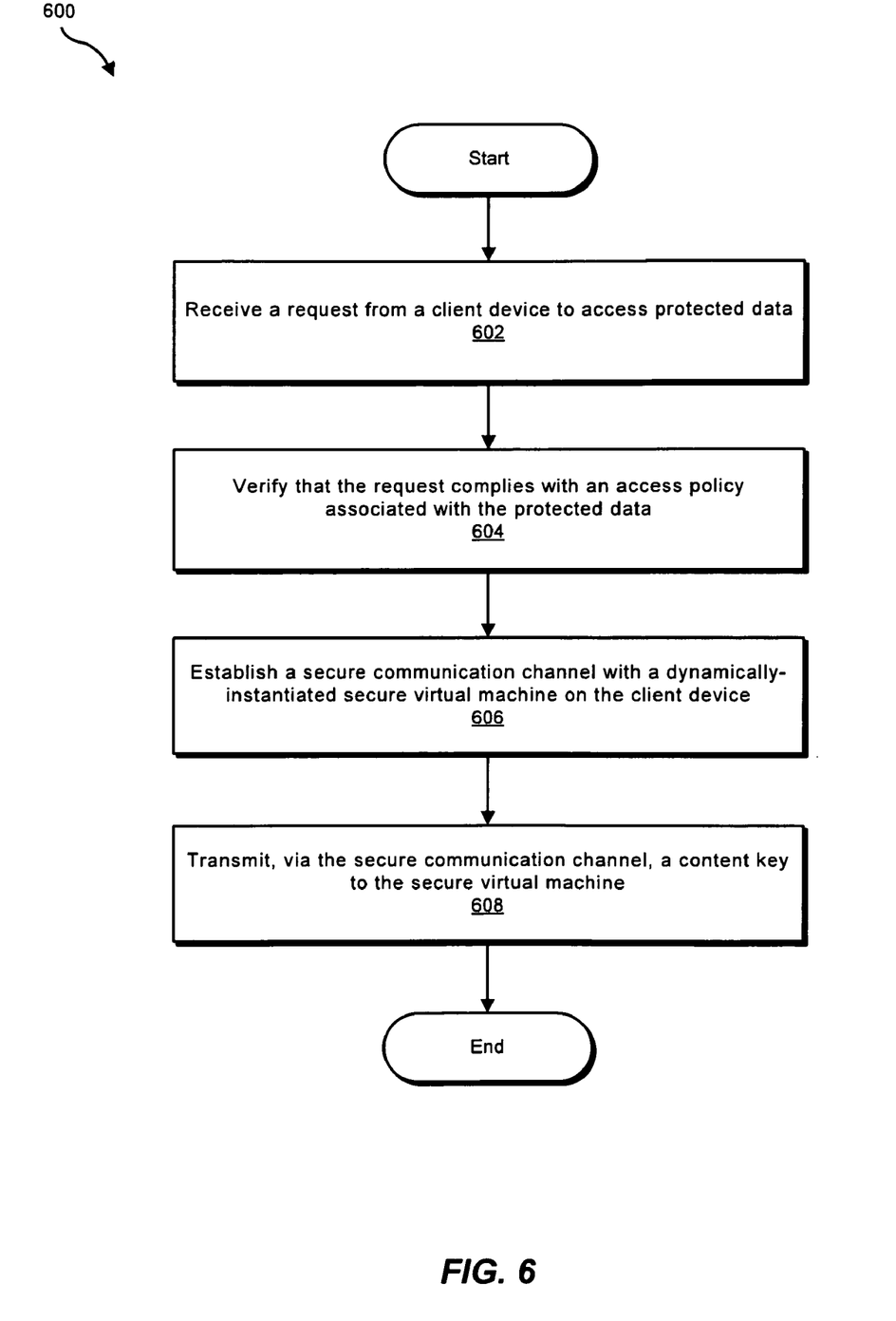
FIG. 6 is a flow diagram of an exemplary server-side method for protecting enterprise rights management keys from being compromised by untrusted client devices.

FIG. 6 is a flow diagram of an exemplary server-side method 600 for protecting enterprise rights management keys from being compromised by untrusted client devices. As illustrated in this figure, at step 602 the system may receive a request from a client device to access protected data. For example, policy server 212 in FIG. 2 may receive a request from client device 202 to access encrypted data 209 and/or encrypted data 215.

At step 604, the system may verify that the request complies with a data-access policy associated with the protected data. For example, policy server 212 may, by examining information (such as authentication and/or authorization information, as detailed above) contained in the request received from client device 202, determine that the request complies with a data-access policy associated with encrypted data 209 and/or encrypted data 219.

At step 606, the system may establish a secure communication channel with a dynamically-instantiated secure virtual machine on the client device. For example, policy server 212 in FIG. 2 may establish a secure communication channel with a dynamically-instantiated secure virtual machine on client device 202.

The system may perform step 606 in a variety of ways. In one example, policy server 212 may establish a secure communication channel by receiving a public channel key from client device 202 that was generated by a secure virtual machine on client device 202, as explained in greater detail above in connection with FIGS. 4-5. In some examples, policy server 212 may verify that the public channel key in fact originated from a secure virtual machine on client device 202 by verifying that a digitally-signed nonce and PCR values received from client device 202 indicate that the public channel key was generated by a secure virtual machine on client device 202.

At step 608, the system may transmit, via the secure communication channel, a content key to the secure virtual machine on the client device. For example, policy server 212 in FIG. 2 may transmit a content key to a secure virtual machine on client device 202 via the secure communication channel.

The system may perform step 608 in a variety of ways. In one example, the system may transmit the content key to the secure virtual machine on the client device via the secure communication channel by: 1) encrypting the content key using the public channel key received from the client device and then 2) transmitting the encrypted content key to the client device. For example, policy server 212 in FIG. 5 may: 1) encrypt a content key using a public channel key received from client device 202 (and generated by secure virtual machine 220) and then 2) transmit this encrypted content key to client device 202. Upon completion of step 608, exemplary method 600 may terminate.

Figure 7:
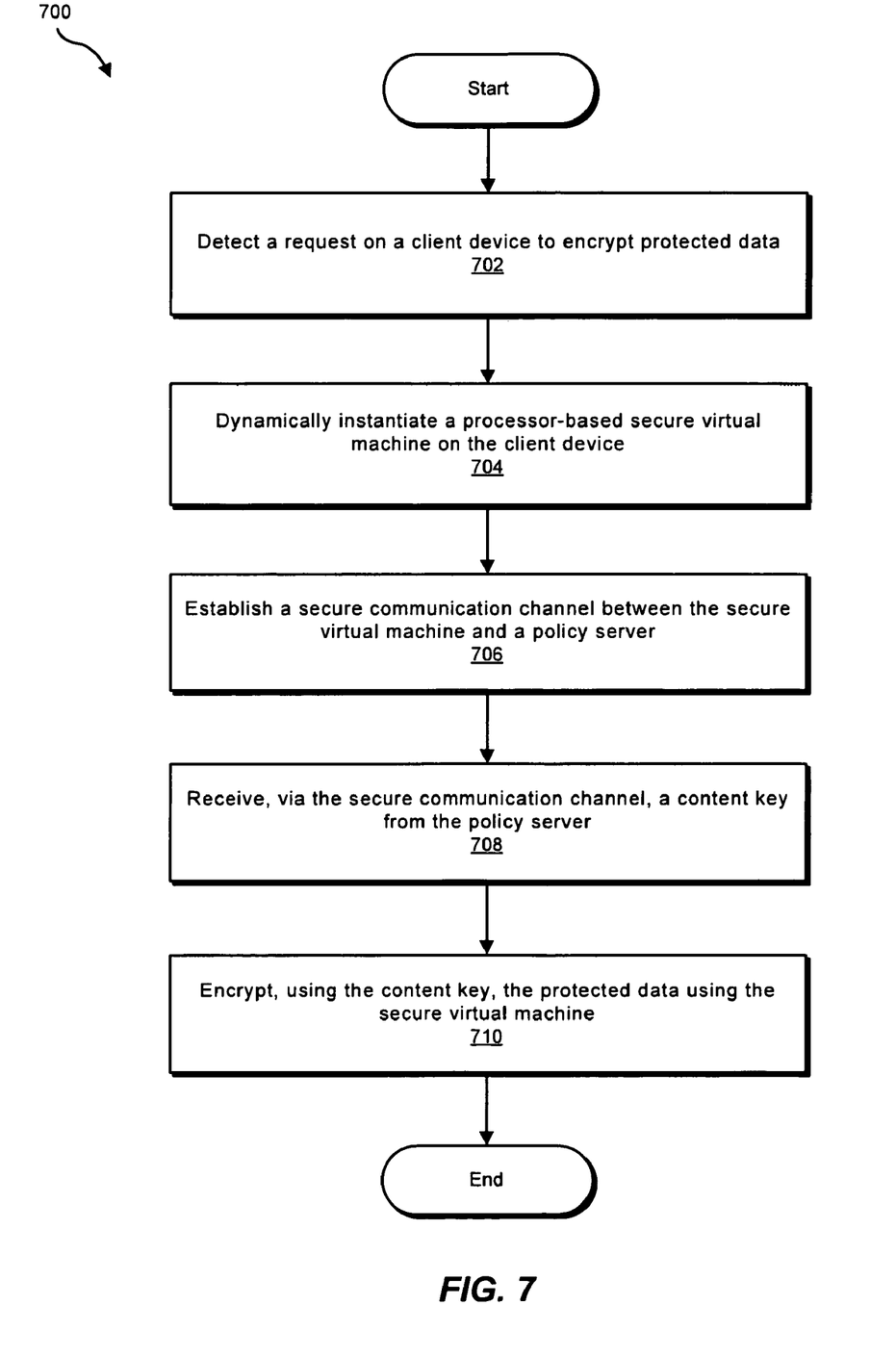
FIG. 7 is a flow diagram of an exemplary client-side method for protecting enterprise rights management keys from being compromised by untrusted client devices according to an additional embodiment.

The systems described herein may also be used to encrypt data on untrusted client devices using content keys received from a policy server. For example, as illustrated in FIG. 7, an exemplary computer-implemented method 700 for securely encrypting data on a client device may comprise: 1) detecting a request on a client device to encrypt protected data (step 702), 2) dynamically instantiating a processor-based secure virtual machine on the client device (step 704), 3) establishing a secure communication channel between the secure virtual machine and a policy server (step 706), 4) receiving, via the secure communication channel, a content key from the policy server (step 708), and then 5) encrypting, using the content key, the protected data using the secure virtual machine (step 710).

Figure 8:
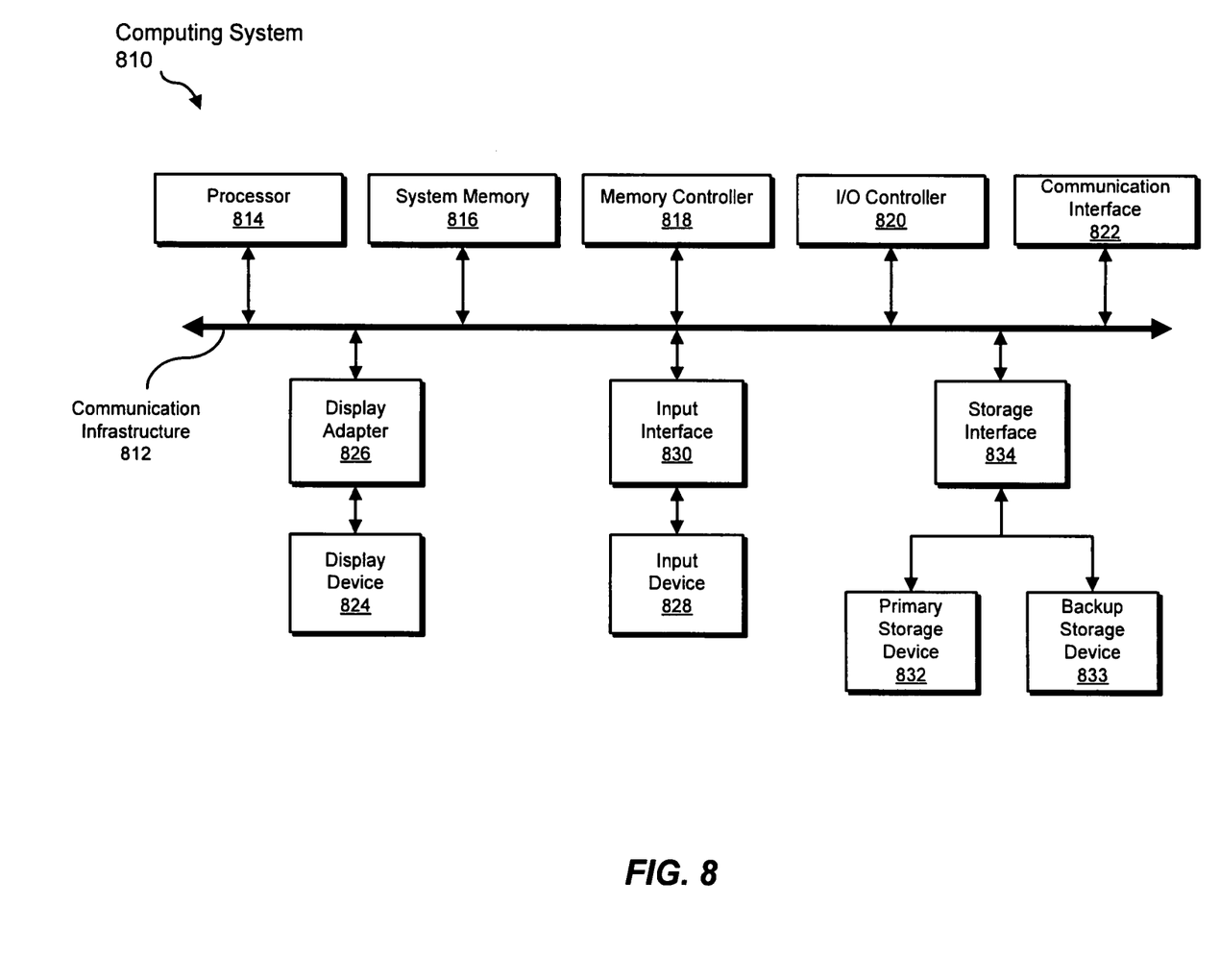
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may comprise at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein. For example, processor 814 may perform and/or be a means for performing, either alone or in combination with other elements, one or more of the detecting, instantiating, establishing, receiving, decrypting, using, generating, sealing, transmitting, resetting, placing, digitally signing, unsealing, determining, initiating, utilizing, creating, protecting, and verifying steps described herein. Processor 814 may also perform and/or be a means for performing any other steps, methods, or processes described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may comprise both a volatile memory unit (such as, for example, system memory 816) and a non-volatile storage device (such as, for example, primary storage device 832, as described in detail below).

In certain embodiments, exemplary computing system 810 may also comprise one or more components or elements in addition to processor 814 and system memory 816. For example, as illustrated in FIG. 8, computing system 810 may comprise a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812. In certain embodiments, memory controller may perform and/or be a means for performing, either alone or in combination with other elements, one or more of the steps or features described and/or illustrated herein, such as detecting, instantiating, establishing, receiving, decrypting, using, generating, sealing, transmitting, resetting, placing, digitally signing, unsealing, determining, initiating, utilizing, creating, protecting, and verifying.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834. I/O controller 820 may be used, for example, to perform and/or be a means for performing, either alone or in combination with other elements, one or more of the detecting, instantiating, establishing, receiving, decrypting, using, generating, sealing, transmitting, resetting, placing, digitally signing, unsealing, determining, initiating, utilizing, creating, protecting, and verifying steps described herein. I/O controller 820 may also be used to perform and/or be a means for performing other steps and features set forth in the instant disclosure.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network comprising additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, SCSI host adapters, USB host adapters, IEEE 894 host adapters, SATA and eSATA host adapters, ATA and PATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution. In certain embodiments, communication interface 822 may perform and/or be a means for performing, either alone or in combination with other elements, one or more of the detecting, instantiating, establishing, receiving, decrypting, using, generating, sealing, transmitting, resetting, placing, digitally signing, unsealing, determining, initiating, utilizing, creating, protecting, and verifying steps disclosed herein. Communication interface 822 may also be used to perform and/or be a means for performing other steps and features set forth in the instant disclosure.

As illustrated in FIG. 8, computing system 810 may also comprise at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also comprise at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device. In at least one embodiment, input device 828 may perform and/or be a means for performing, either alone or in combination with other elements, one or more of the detecting, instantiating, establishing, receiving, decrypting, using, generating, sealing, transmitting, resetting, placing, digitally signing, unsealing, determining, initiating, utilizing, creating, protecting, and verifying steps disclosed herein. Input device 828 may also be used to perform and/or be a means for performing other steps and features set forth in the instant disclosure.

As illustrated in FIG. 8, exemplary computing system 810 may also comprise a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also comprise other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

In certain embodiments, storage devices 832 and 833 may be used, for example, to perform and/or be a means for performing, either alone or in combination with other elements, one or more of the detecting, instantiating, establishing, receiving, decrypting, using, generating, sealing, transmitting, resetting, placing, digitally signing, unsealing, determining, initiating, creating, utilizing, protecting, and verifying steps disclosed herein. Storage devices 832 and 833 may also be used to perform and/or be a means for performing other steps and features set forth in the instant disclosure.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

Figure 9:
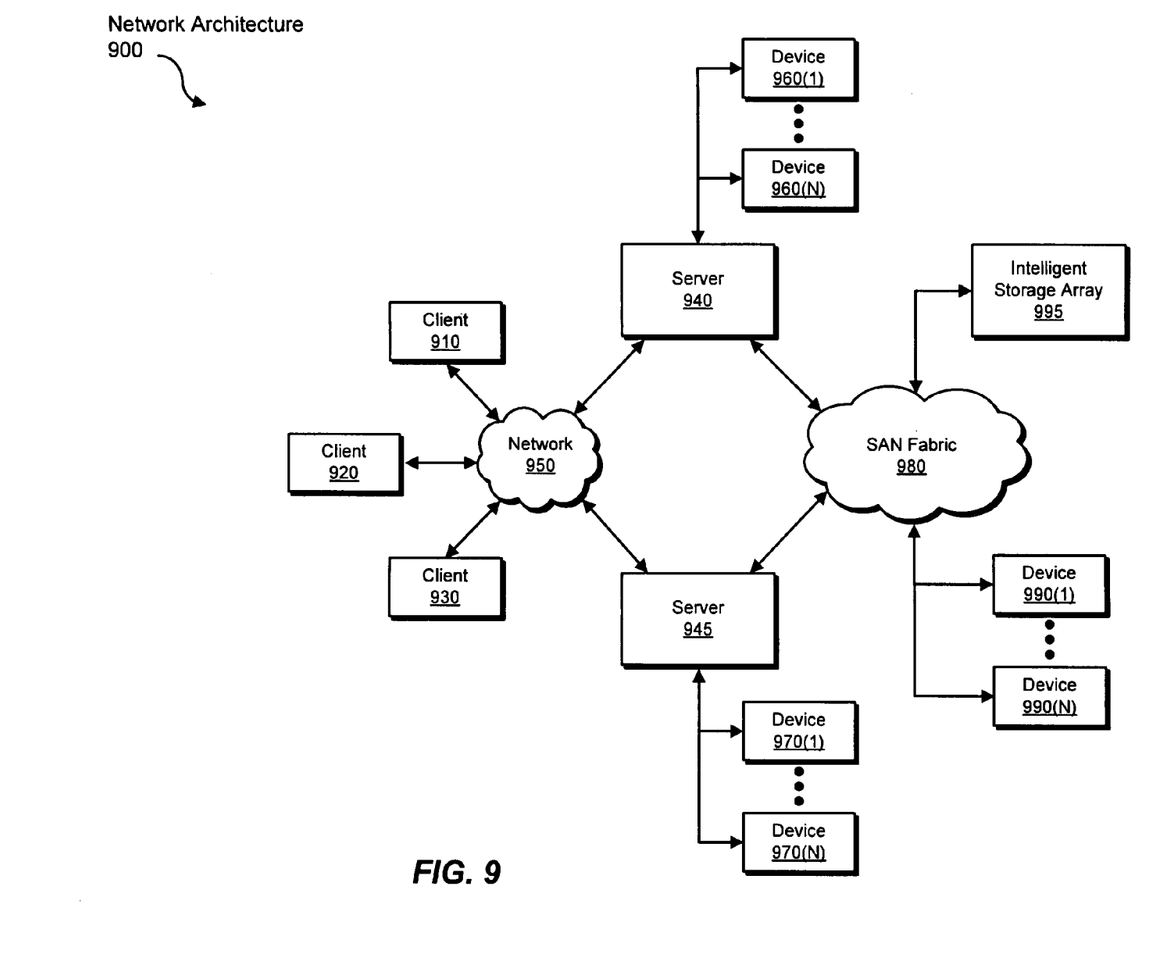
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a wide area network (WAN), a local area network (LAN), a personal area network (PAN), or the Internet.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950. Accordingly, network architecture 900 may perform and/or be a means for detecting, instantiating, establishing, receiving, decrypting, using, generating, sealing, transmitting, resetting, placing, digitally signing, unsealing, determining, initiating, utilizing, creating, protecting, and verifying steps disclosed herein. Network architecture 900 may also be used to perform and/or be a means for performing other steps and features set forth in the instant disclosure.

As detailed above, computing system 810 and/or one or more components of network architecture 900 may perform and/or be a means for performing, either alone or in combination with other elements, one or more steps of an exemplary method for protecting enterprise rights management keys from being compromised by untrusted client devices. In one example, a method for performing such a task may comprise: 1) detecting a request on a client device to access protected data (stored, for example, on a local storage device and/or a remote storage device), 2) dynamically instantiating a processor-based secure virtual machine on the client device, 3) establishing a secure communication channel between the secure virtual machine and a policy server, 4) receiving, via the secure communication channel, a content key from the policy server, and then 5) decrypting, using the content key, the protected data using the secure virtual machine.

In some examples, establishing the secure communication channel may comprise: 1) generating, using the secure virtual machine, a private channel key and a public channel key, 2) sealing, using a security coprocessor on the client device, the private channel key so that only the secure virtual machine may unseal the private channel key, and then 3) transmitting the public channel key to the policy server.

The method may seal the private channel key by: 1) leveraging hardware-based security extensions on the client device to dynamically instantiate the secure virtual machine, which in turn may a) reset PCRs on the security coprocessor and b) place a hash of the secure virtual machine into the PCRs, and then 2) encrypting, using the security coprocessor, the private channel key based at least in part on the hash of the secure virtual machine that is stored in the PCRs.

Establishing the secure communication channel may also comprise transmitting, to the policy server, the values stored in the PCRs. In some examples, the method may comprise, prior to transmitting the public channel key and the values stored in the PCRs to the policy server, digitally signing, using the security coprocessor, the public channel key and the values stored in the PCRs. The method may also comprise, prior to receiving the content key from the policy server, transmitting information to the policy server that verifies that the request complies with a data-access policy associated with the protected data. In some examples, receiving the content key from the policy server may comprise receiving, from the policy server, an encrypted version of the content key that has been encrypted using the public channel key.

The method may also comprise unsealing the private channel key for use by the secure virtual machine. In some examples, the method may unseal the unseal the private channel key by: 1) determining that values stored in PCRs on the security coprocessor verify that the secure virtual machine has been instantiated and then 2) decrypting, using the security coprocessor, the private channel key based at least in part on the values stored in the PCRs. The method may also comprise decrypting, using the private channel key, the encrypted version of the content key using the secure virtual machine.

In some examples, dynamically instantiating the secure virtual machine may comprise instantiating the secure virtual machine without initiating a trusted boot process. Dynamically instantiating the secure virtual machine may also comprise utilizing hardware-based security extensions on the client device to create an execution environment on the client device that is completely insulated from all other software on the client device. Examples of such hardware-based security extensions include processor-based security extensions, chipset-based security extensions, user-input-based security extensions, and display-interface-based security extensions.

Similarly, a corresponding server-side method for protecting enterprise rights management keys from being compromised by untrusted client devices may comprise: 1) receiving a request from a client device to access protected data, 2) verifying that the request complies with a data-access policy associated with the protected data, 3) establishing a secure communication channel with a dynamically-instantiated, processor-based secure virtual machine on the client device, and then 4) transmitting, via the secure communication channel, a content key to the secure virtual machine.

The method may establish the secure communication channel by receiving, from client device, a public channel key generated by the secure virtual machine on the client device. In this example, transmitting, via the secure communication channel, the content key to the secure virtual machine may comprise: 1) encrypting the content key using the public channel key and then 2) transmitting the encrypted content key to the client device.

The method may also comprise verifying that the public channel key originated from the secure virtual machine on the client device by: 1) receiving, from the client device, values stored in PCRs on the security coprocessor and then 2) verifying, based at least in part on the values stored in the platform configuration registers, that the public channel key originated from the secure virtual machine.

In addition, an exemplary computer-implemented method for securely encrypting data on a client device may comprise: 1) detecting a request on a client device to encrypt protected data, 2) dynamically instantiating a processor-based secure virtual machine on the client device, 3) establishing a secure communication channel between the secure virtual machine and a policy server, 4) receiving, via the secure communication channel, a content key from the policy server, and then 5) encrypting, using the content key, the protected data using the secure virtual machine.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for protecting enterprise rights management keys from being compromised by untrusted client devices, the method comprising:
    detecting a request on a client device to access protected data;
    dynamically instantiating a processor-based secure virtual machine on the client device;
    establishing a secure communication channel between the secure virtual machine and a policy server by:
        generating, using the secure virtual machine, a private channel key and a public channel key;
        sealing, using a security coprocessor on the client device, the private channel key so that only the secure virtual machine may unseal the private channel key;
        transmitting the public channel key to the policy server;
    receiving, via the secure communication channel, a content key from the policy server;
    decrypting, using the content key, the protected data using the secure virtual machine.

2. The method of claim 1, wherein sealing the private channel key so that only the secure virtual machine may unseal the private channel key comprises:
    leveraging hardware-based security extensions on the client device to dynamically instantiate the secure virtual machine, which in turn resets platform configuration registers on the security coprocessor and places a hash of the secure virtual machine into the platform configuration registers;
    encrypting, using the security coprocessor, the private channel key based at least in part on the hash of the secure virtual machine that is stored in the platform configuration registers.

3. The method of claim 2, wherein establishing the secure communication channel further comprises transmitting, to the policy server, the values stored in the platform configuration registers.

4. The method of claim 3, wherein establishing the secure communication channel further comprises, prior to transmitting the public channel key and the values stored in the platform configuration registers to the policy server, digitally signing the public channel key and the values stored in the platform configuration registers using the security coprocessor.

5. The method of claim 1, further comprising, prior to receiving the content key from the policy server, transmitting information to the policy server that verifies that the request complies with a data-access policy associated with the protected data.

6. The method of claim 1, wherein receiving the content key from the policy server comprises receiving, from the policy server, an encrypted version of the content key that has been encrypted using the public channel key.

7. The method of claim 6, further comprising unsealing the private channel key for use by the secure virtual machine.

8. The method of claim 7, wherein unsealing the private channel key comprises:
    determining that values stored in platform configuration registers on the security coprocessor verify that the secure virtual machine has been instantiated;
    decrypting, using the security coprocessor, the private channel key based at least in part on the values stored in the platform configuration registers.

9. The method of claim 7, further comprising decrypting, using the private channel key, the encrypted version of the content key using the secure virtual machine.

10. The method of claim 1, wherein dynamically instantiating the secure virtual machine comprises instantiating the secure virtual machine without initiating a trusted boot process.

11. The method of claim 1, wherein the protected data is stored on:
    a local storage device;
    a remote storage device.

12. The method of claim 1, wherein dynamically instantiating the secure virtual machine comprises utilizing hardware-based security extensions on the client device to create an execution environment on the client device that is completely insulated from all other software on the client device.

13. The method of claim 12, wherein the hardware-based security extensions comprise at least one of:
    processor-based security extensions;
    chipset-based security extensions;
    user-input-based security extensions;
    display-interface-based security extensions.

14. A computer-implemented method for protecting enterprise rights management keys from being compromised by untrusted client devices, the computer-implemented method comprising:
    detecting a request on a client device to encrypt protected data;
    dynamically instantiating a processor-based secure virtual machine on the client device;
    establishing a secure communication channel between the secure virtual machine and a policy server by:
        generating, using the secure virtual machine, a private channel key and a public channel key;
        sealing, using a security coprocessor on the client device, the private channel key so that only the secure virtual machine may unseal the private channel key;
        transmitting the public channel key to the policy server;
    receiving, via the secure communication channel, a content key from the policy server;
    encrypting, using the content key, the protected data using the secure virtual machine.

* * * * *